United States Patent Office 3,517,094
Patented June 23, 1970

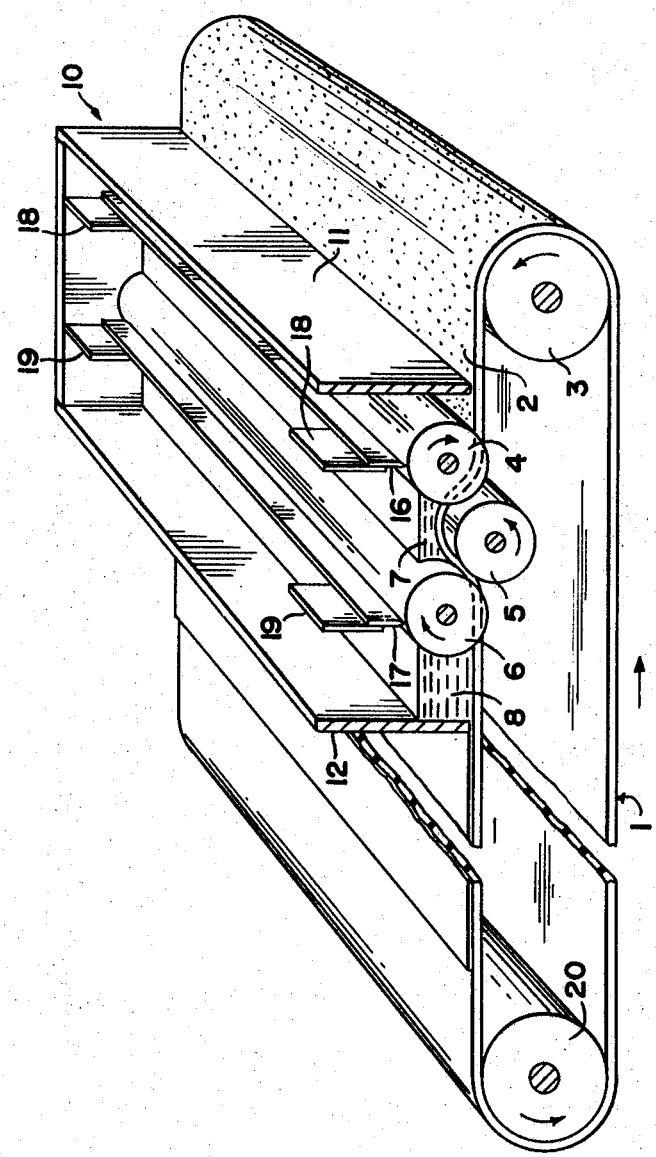
INVENTOR.
NORMAN FORREST
BY
Oldham & Oldham
ATTORNEYS.

3,517,094
METHOD OF FILLING A FLEXIBLE MOLD
Norman Forrest, Byram, Conn., assignor to Tenneco Chemicals, Inc., a corporation of Delaware
Filed Sept. 28, 1967, Ser. No. 671,323
Int. Cl. B29d 7/08
U.S. Cl. 264—167                                      7 Claims

ABSTRACT OF THE DISCLOSURE

A mold filling method comprising sequentially compressing and then releasing at least twice a flexible, endless molding belt having an exposed textured surface provided with molding cavities. The releasing steps are carried out while the exposed surface of the flexible, endless mold belt is positioned below the surface of a reservoir of a liquid plastic molding material.

---

The present invention relates to an improved mold filling method. More particularly, the invention pertains to a continuous method for filling a flexible, endless mold surface with plastic material in the manufacture of synthetic products which simulate the appearance of natural fabrics, laces, mattings and other textured surfaces.

In recent years a number of molding processes have been disclosed for the continuous casting of sheets having highly textured surfaces from various plastic materials. For example, in U.S. Pat. No. 3,098,262 a continuous molding process is proposed wherein textured synthetic sheet products, having surfaces varying in appearance from that of fine suede to that of pile, carpet, or even fur, can be formed by molding plastic material. The described process involves, in general, the use of an endless, flexible band which acts both as a carrier and a casting mold or "negative mold." This endless, flexible mold receives the plastic material in a liquid or viscous state and imparts the desired textured surface, and then advances the plastic material to subsequent stage wherein it is converted to a solid state by vulcanization, polymerization or fusion. Such a molding process is typical of many of the procedures recently disclosed and considerable work has been undertaken to effect improvements and to overcome the problems encountered in developing commercially attractive scale manufacturing operations. One serious problem pertained to the preparation of an endless, flexible molding belt which would withstand the rigours of continuous commercial operations and which would in its function as the negative mold, ensure the production of a synthetic sheet having a consistant and uniform surface with the desired textural configuration. Another serious problem encountered involved the method of filling the exposed surface of the flexible negative mold with the liquid or viscous plastic feed material. A sufficiently fast filling method which did not sacrifice accurate and faithful mold reproductions had to be provided. The use of conventional mold filling procedures proved unsuccessful. It was found that when the liquid or viscous plastic material was spread on the exposed surface of the negative mold, air was entrapped in the mold cavities or in the surface depressions. Unless the air is removed or expelled prior to the curing step, the fluid plastic material is prevented from completely filling the molding cavity or depression thereby resulting in a final synthetic molded product which is non-uniform and lacks the high degree of natural fabric simulation required for commercial purposes.

The problems associated wtih the entrapment of air in the molding cavities or depressions of the mold has been recognized in the prior art, and the usual procedure of expelling the entrapped air is disclosed in U.S. Pat. No. 3,098,262. In this procedure the section of the flexible, endless molding belt coated with the liquid or viscous plastic material is passed through a suction chamber and subjected to partial vacuum whereupon the entrapped air expands and forces its way through the uncured plastic layer and is then withdrawn. The liquid or viscous plastic material may enter and completely fill the entire molding cavity or depression. Although this procedure can effectively remove substantially all of the entrapped air, it has numerous disadvantages. For one thing, an additional step is required in the overall molding process and special equipment such as suction and vacuum means has to be employed.

A more serious objection to this procedure, however, resides in the need to carry out the partial vacuum or reduction in pressure treatment for a sufficient period of time to effect substantially complete withdrawal of the entrapped air. Thus, not only is the total time for completing the molding cycle undesirably increased but the mold filling speed is also deteriously affected. Obviously the time interval for expelling the entrapped air will vary widely depending on the depth of the cavities or surface depressions, the relative complexity of the textured surface of the negative mold, the viscosity of the liquid or viscous plastic material, etc. Numerous adjustments and test runs would also be required prior to the commencement of each commercial operation. The direct effect of the time interval for expelling the entrapped air on the overall molding time cycle is also readily apparent; and as this time interval increases, the time required for carrying out the complete operation increases proportionally and becomes an important factor in the economics of the manufacting system.

One object of the present invention is to provide an improved method for filling flexible molds with plastic material which avoids the disadvantages and the difficulties encountered in the prior art procedures.

Another object of the present invention is to provide a relatively high speed flexible mold filling method wherein entrapped air is effectively removed from the cavities or depressions in the exposed surface of the negative mold.

A further object of the present invention is to provide a method for substantially complete filling of the mold cavities or depressions with plastic material such that accurate, high quality reproduction of the mold configurations is obtained.

A still further object of the present invention is to provide an improved continuous method for filling the exposed surface of a flexible, endless negative mold with vinyl plastisols.

These and other objects of the present invention will become readily apparent from the ensuing description and illustrative embodiment.

In accordance with the present invention it has now been found that the exposed surface of a flexible, endless mold can be filled at a relatively fast rate with a liquid or viscous plastic material such as vinyl plastisol, while concurrently expelling the air entrapped in the exposed surface cavities or depressions, by utilizing the following sequential procedure:

(1) compressing the section of the flexible mold to be filled with the plastic material to expel air from the molding cavities or depressions;

(2) releasing the compressed section of the flexible mold while its exposed surface is positioned below the surface of a pool or reservoir of the plastic material thereby pre-wetting and filling the molding cavities or depressions;

(3) compressing the thus filled section of the flexible mold to expel plastic material and any remaining entrapped air therefrom; and (4) releasing the compressed section of the flexible mold again while its exposed surface is positioned below the surface of a poor or reservoir of the plastic material thereby completely filling the molding cavities or depressions with the liquid or viscous plastic material and ensuring a faithful reproduction of the textured surface of the endless mold.

Actual operations utilizing the above described mold filling method have led to the preparation of final molded plastic products which are outstanding reproductions of the exposed surface of the flexible, endless mold. Not only are the molded plastic products free of the flaws resulting from the presence of entrapped air in the molding cavities, but the mold filling step was accomplished at rates which were more than suitable for high speed commercial molding operations. These desirable results were achieved by utilizing the present concept of minimizing air entrapment through the initial compression step and the elimination of any air subsequently entrapped in the two releasing-fiilling steps separated by a second compression step. It will be further understood that additional sequential compression and releasing-filling steps may also be effectively employed if desired because of the configuration of the negative mold or the nature of the plastic fed material. In general, it was found that the sequential mold filling method outlined above is sufficient for various molding processes utilizing a flexible, endless molds. For some processes, however, a series of four or more such sequential steps may be employed to obtain even faster mold filling operations.

Elastomeric resins such as silicone rubber or its copolymers, neoprene, flexible epoxy, urethane, fluoroplastics and the like are employed to form the flexible, endless molds. The preferred negative molds are prepared from RTV silicone rubber, having a molecular weight ranging from about 2000 to 300, since molds formed therefrom have the desired flexibility, high temperature resistance, and comparatively long life. However, it will be understood that neither the material nor the procedure employed in preparing the flexible, endless mold constitute essential features of the present invention.

Uncured synthetic thermoplastic or thermosetting resins or polymeric compositions, which undergo a phase change from liquid to solid as a result of curing with or without the application of heat or as a result of solvent evaporation may be employed as the plastic molding material in the method of this invention. The use of thermoplastic resins such as vinyl plastisols or vinyl organosols is especially preferred, and the present mold filling method will be described below in greater detail with respect to the use of vinyl plastisols such as those commercially available under the trade names Tenneco 1755 and Tenneco 1742. Other resins may of course be utilized with equal effectiveness for the production of a variety of molded plastic products, and reference is made to my copending application Ser. No. 671,304 filed concurrently herewith for other suitable materials for use in practice of the inventions.

In general, commercial molding operations will comprise the use of a continuous flexible mold band having a textured surface which proceeds through a series of typical molding steps including mold filling, backing, curing, separation, as well as other well known treatments to produce molded plastic products in a continuous manner. The exact pattern of the exposed surface of the flexible, endless mold also does not pertain to the exact point of novelty of the present invention. It is well recognized, however, that the preparation of products having the surface characteristic of natural suede is diffcult, if not impossible, to achieve readily with the known molding procedures even with the use of polyvinyl chloride plastisols. One reason for this difficulty resides in the need to employ a negative mold provided with numerous, very minute cavities which must be devoid of entrapped air and completely filled in the mold filling step in order to achieve a high quality product. In actual operations, the mold filling method of this invention has proven to be effective in the preparation of synthetic suede sheets which are characterized by outstanding simulation to natural suede. This aspect of the invention will also be illustrated below.

The basic concept of the mold filling method of this invention may be employed in connection with various types of apparatus and the particular form of apparatus does not constitute a critical feature of this invention. Thus, mold filling zones containing compression and release means of different designs may be employed. In an accompanying drawing here is shown a perspective, partially broken away, fragmentary view of one form of apparatus that is suitable for carrying out the present mold filling method.

Referring now to the drawing, a flexible, endless, silicone rubber belt 1 having its exposed surface 2 is specially prepared to present a configuration which is the negative of that desired in the plastic product. For imparting a suede finish to the surface of the plastic product, the exposed surface 2 of flexible belt 1 may have a multiplicity of very narrow cavities ranging from about 0.010 to 0.625 inch in depth, untapered, and numbering from about 10,000 to 500,000 per square inch or more. Flexible belt 1 moves over the outer periphery of roller 3 and at least one other spaced apart roller 20 provided with driving means (not shown) which is parallel to roller 3 and positioned after intermediate treatment steps such as curing, backing, etc. (not shown).

Molding belt 1 moves horizontally in the direction of the arrows shown, passes around roller 3 and enters molding zone 10 having vertically adjustable front and back sides 11 and 12, respectively, positioned by any convenient means (not shown). Molding zone 10 is rectangular in shape, somewhat narrower in width than belt 1, and with an open top and bottom, and shown with one sider emoved for clarity. The lower edges of each of the four walls of molding zone 10, to prevent leakage of plastisol, are in close proximity to exposed surface 2 of belt 1. Any suitable sealing means may be provided between the side walls of the molding zone and the belt 1. Front wall 11 usually is adjusted to contact exposed surface 2 and it may have any desired scraper means thereon to ensure that any solid contaminants are scraped from the exposed surface of belt 1 prior to passage into molding zone 10 and any such solids may be suitably removed at intervals. A series of pressure rollers 4, 5 and 6 are positioned so as to divide molding zone 10 into three separate, substantially liquid tight sections where the side walls are in contact with belt 1. Squeegee means 16 and 17 are provided at the upper exposed surfaces of rollers 4 and 6, respectively, to avoid a clockwise flow of plastisol. Suitable supports 18 and 19, respectively, are provided for the squeegee means 16 and 17. As belt 1 continuously passes under the lower edge of front wall 11, it is compressed between the outer peripheries of rollers 4 and 5 to expel a substantial amount of the air from the minute molding cavities located in exposed surface 2. When the compressed section of belt 1 passes over the upper periphery of roller 5, it is released from compression while submerged in a reservoir of uncured liquid vinyl plastisol 7 located between rollers 4 and 6. The uncured liquid vinyl plastisol enters into the molding cavities on exposed surface 2, but is subsequently expelled along with any remaining entrapped air from the cavities as belt 1 is recompressed between rollers 5 and 6. This compressed section of belt 1 is then released while submerged in reservoir 8 of liquid vinyl plastisol maintained between roller 6 and back wall 12 of molding zone 10. The vinyl plastisol completely fills the molding cavities and coats the surface of exposed surface 2. The depth of this coating can be regulated and leveled by adjusting the space between the lower edge of wall 12 and exposed surface 2. Roller 5 is also driven by conventional motor mechanisms (not shown), which is synchronized with the driving means of roller 20, and the positions of the rolls 4, 5 and 6 are usually adjustable to provide the desired pressure engagement therebetween of the belt being filled in the molding zone.

The uncured viscous liquid vinyl plastisol employed in reservoirs 7 and 8 generally have the same formulations and ordinary liquid filling means (not shown) may intermittently supply liquid vinyl plastisol to each of the reservoirs to maintain them at the desired levels.

For some purposes, it is advantageous to also maintain a reservoir of the liquid vinyl plastisol between roller 4 and the front wall 11 of molding zone 10 to effect pre-wetting. As previously discussed, the series of compression and release filling steps may exceed the number illustrated above thereby requiring a longer molding zone containing additional pressure rollers.

After the coated exposed surface 2 passes out of molding zone 10 it is subjected to known backing, curing, etc. treatments prior to the final step of stripping the molded plastic product from belt 1, which then passes around the outer periphery of roller 20 and back to molding zone 10. Alternatively, stripping can be carried out in the vicinity of roller 3.

The heat curable vinyl plastisol composition employed in the above described mold filling method had the following composition:

| | Parts by weight |
|---|---|
| Polyvinyl chloride resin | 100 |
| Dioctyl phthalate | 35 |
| Dioctyl adipate | 10 |
| Stabilizer [1] | 5 |

[1] Barium dinonylphenate—30% by wt. Cadmium bis (2 ethyl hexoate)—18% by wt. Diethenyl isooctyl phosphite—52% by wt.

The practice of the improved mold filling method of the invention as illustrated above led to a synthetic suede sheet product free of the surface irregularities and blemishes which were present when the liquid or viscous uncured plastic feed material failed to completely fill the mold cavities or depressions because of the presence of entrapped air or inadequate filling procedures. In addition, the aforedescribed progressive and continuous mold filling method was accomplished at high rates of speed which permitted the overall molding cycle to be completed in time periods suitable for large scale commercial operations.

The walls 11 and 12 are adjustably positoned in any suitable manner.

It also should be noted that in some instances, it may be desirable to fill the molding zone with the plastic mold filling material to a height above the rolls 4 and 6.

While particular embodiments of this invention are shown above, it will be understood that the invention is obviously subject to variations and modifications without departing from its broader aspects.

What is claimed is:

1. A continuous method for filling a multiplicity of minute mold cavities on the exposed surface of a flexible, endless molding belt with liquid or viscous plastic material which comprises continuously passing a section of the endless molding belt to a molding zone and then carrying out the following sequential steps:
    (a) compressing said section of the endless molding belt to expel air from the mold cavities,
    (b) releasing said compressed section of the endless molding belt while the exposed surface thereof is submerged below the surface of a reservoir of the plastic material thereby filling said mold cavities with plastic material,
    (c) compressing said released section of the endless molding belt to expel plastic material and any remaining entrapped air from the mold cavities, and
    (d) releasing said compressed section of the endless molding belt while the exposed surface thereof is submerged below the surface of a reservoir of the plastic material thereby completely filling the mold cavities with the plastic material.

2. The method of claim 1 wherein the flexible, endless molding belt is composed of silicone rubber.

3. The method of claim 1 wherein said plastic material is a vinyl plastisol.

4. The method of claim 3 wherein said vinyl plastisol is a polyvinyl chloride plastisol.

5. The method of claim 1 wherein the section of the endless molding belt is pre-wet with the plastic material prior to the initial compressing step.

6. The method of claim 1 wherein the mold cavities on the exposed surface of the endless molding belt number from about 10,000 to 500,000 per square inch.

7. The method of claim 1 wherein said section of the endless molding belt is subjected to at least one additional sequential compressing and releasing step while in the molding zone.

References Cited

UNITED STATES PATENTS

| 2,759,517 | 8/1956 | Marco | 156—246 X |
| 3,098,262 | 7/1963 | Wisotzky | 264—102 X |
| 3,190,947 | 6/1965 | Norcross | 264—216 X |

ROBERT F. WHITE, Primary Examiner

K. J. HOVET, Assistant Examiner

U.S. Cl. X.R.

264—175, 215, 306, 313